US006687098B1

United States Patent
Huai

(12) United States Patent
(10) Patent No.: US 6,687,098 B1
(45) Date of Patent: Feb. 3, 2004

(54) TOP SPIN VALVE WITH IMPROVED SEED LAYER

(75) Inventor: Yiming Huai, Pleasanton, CA (US)

(73) Assignee: Western Digital (Fremont), Inc., Fremont, CA (US)

(*) Notice: Subject to any disclaimer, the term of this patent is extended or adjusted under 35 U.S.C. 154(b) by 383 days.

(21) Appl. No.: 09/349,745

(22) Filed: Jul. 8, 1999

(51) Int. Cl.[7] .............................................. G11B 5/127
(52) U.S. Cl. ................................................ 360/324.12
(58) Field of Search ................................ 360/314, 324, 360/324.1, 324.11, 324.12

(56) References Cited

U.S. PATENT DOCUMENTS

| | | |
|---|---|---|
| 4,907,113 A | 3/1990 | Mallary |
| 5,111,352 A | 5/1992 | Das et al. |
| 5,206,590 A | 4/1993 | Dieny et al. |
| 5,408,377 A | 4/1995 | Gurney et al. |
| 5,492,720 A | 2/1996 | Gill et al. |
| 5,508,866 A | 4/1996 | Gill et al. |
| 5,583,725 A * | 12/1996 | Coffey et al. ............... 360/113 |
| 5,591,533 A | 1/1997 | Pinarbasi |
| 5,637,235 A * | 6/1997 | Kim et al. ...................... 216/22 |
| 5,638,235 A | 6/1997 | Gill et al. |
| 5,666,246 A | 9/1997 | Gill et al. |
| 5,701,223 A | 12/1997 | Fontana, Jr. et al. |
| 5,715,120 A | 2/1998 | Gill |
| 5,731,936 A | 3/1998 | Lee et al. |
| 5,738,946 A | 4/1998 | Iwasaki et al. |
| 5,764,445 A | 6/1998 | Torng et al. |
| 5,766,780 A | 6/1998 | Huang et al. |
| 5,850,323 A * | 12/1998 | Kanai ........................... 360/113 |

* cited by examiner

Primary Examiner—George J. Letscher
(74) Attorney, Agent, or Firm—Carr & Ferrell LLP

(57) ABSTRACT

The present invention provides an improved top spin valve and method of fabrication. In the preferred embodiment of the top spin valve of the present invention, a seed layer is formed of non-magnetic material having the elements Ni and Cr. In the preferred embodiments, the seed layer material has an ion milling rate comparable to that of the free layer material. This allows free layer sidewalls to be formed with shorter tails, improving free layer-to-magnetic bias layer junction, thus improving free layer domain structure and track width. In one embodiment, the seed layer may have NiFeCr, with Cr from about 20% to 50%. In another embodiment, the seed layer may have NiCr, with about 40%. Some embodiments may have the seed layer formed on an optional Ta pre-seed layer. Such embodiments provide an improved fcc (111) texture particularly for NiFe and for NiFe/CoFe free layers grown on a seed layer improving spin valve performance, and especially in embodiments having very thin NiFe free layers, ultra thin NiFe free layers, and free layers without NiFe, such as a free layer of CoFe. Such a seed layer can improve AFM pinning layer texture to improve the exchange bias, thus providing better thermal stability. Such a seed layer also provides high resistivity and can improve the magnetostriction of adjacent NiFe free layer material or improve the soft properties of an adjacent CoFe free layer.

21 Claims, 4 Drawing Sheets

| | Rs (Ohm/sq) | ΔR/R min(%) | ΔRs | Hex (Oe) |
|---|---|---|---|---|
| Si/Ta50/NiFe50/CoFe20/Cu25/CoFe22/PtMn300/Ta50 | 12.92 | 7.4% | 0.890 | ~900 |
| Si/NiFeCr50/NiFe50/CoFe20/Cu25/CoFe22/PtMn300/Ta50 | 12.32 | 7.8% | 0.891 | ~1100 |
| Si/Ta20/NiFeCr30/NiFe50/CoFe20/Cu25/CoFe22/PtMn300/Ta50 | 13.13 | 7.3% | 0.893 | 1150 |

FIG. 4

TOP SPIN VALVE WITH IMPROVED SEED LAYER

BACKGROUND OF THE INVENTION

1. Technical Field

The present invention relates to the field of top spin-valve sensors.

2. Background Art

Spin valve sensors exploit changes in electrical resistance which occurs as a result of manipulating the relative orientation of the magnetization of ferromagnetic layers within a spin valve sensor. In conventional spin valve sensors, one ferromagnetic layer has its magnetization pinned while another, which has its magnetization set perpendicular to the pinned layer, is free to change its magnetic orientation in response to magnetized bits on $R{\downarrow}{\uparrow}$ is the resistance across the sensor when the magnetization of the layers are not aligned $R{\downarrow}{\downarrow}$ is the resistance across the sensor when the magnetization of the layers are aligned.

Spin valve layout and materials selection for the spin valve is critical to optimizing the GMR effect and sensor performance.

As data bits are made smaller to increase data density, the magnetic field generated by the smaller bits becomes weaker. Thus, there is less magnetic field to rotate the free layer. As a result, the free layer must be made thinner so it can be saturated by the weaker magnetic fields as discussed in U.S. patent application Ser. No. 09/356-617, by Anderson and Haui, entitled ULTRA THIN FREE LAYER SPIN-VALVE DEVICE WITH ENHANCEMENT LAYER, filed on Jul. 19, 1999, herein incorporated by reference in its entirety.

As free layer thickness is reduced, it becomes more important to establish good texture throughout the entire free layer and spin valve. Conventional spin valves are formed on a tantalum seed layer to provide desired crystalline texture. Although a tantalum seed layer does provide a suitable texture for conventional free layers, as free layer thickness is reduced, the tantalum seed layer does not provide optimum texture for the free layer. This is because tantalum does not immediately establish good texture in the free layer material but rather facilitates the free layer to gradually establish good texture. Thus, as free layer thickness is reduced, the tantalum seed layer an adjacent recording media. The magnetized bits on the recoding media, therefore, change the relative magnetization between the pinned layer and the free layer. A sensing current through the spin valve is used to detect changes in the resistance of the spin valve that results from changes in the relative magnetization of the pinned and free layers.

Examples of this spin valve sensors may be found in U.S. Pat. No. 5,206,590, by Dieny et al., entitled MAGNETORESISTIVE SENSOR BASED ON THE SPIN VALVE EFFECT, issued on Apr. 27, 1993; in U.S. Pat. No. 5,701,223, by Fontana et al., entitled SPIN VALVE MAGNETORESISTIVE SENSOR WITH ANTIPARALLEL PINNED LAYER AND IMPROVED EXCHANGE BIAS LAYER, AND MAGNETIC RECORDING SYSTEM USING THE SENSOR, issued on Dec. 23, 1997; and in U.S. patent application Ser. No. 09/135,939, by Huai and Lederman, entitled SYNTHETIC ANTIFERROMAGNETIC STRUCTURE FOR USE IN A SPIN-VALVE DEVICE AND METHOD OF FABRICATION, issued on Jan. 16, 2000 as U.S. Pat. No. 6,175,476, all herein incorporated by reference in their entireties.

As discussed above, the magnetic moment on the magnetic media changes the resistance across the spin valve which can be detected by passing a current through the spin valve. The giant magnetoresistance, one measure of the performance of a spin valve, is given by:

$$GMR=(R{\downarrow}{\uparrow}-R{\uparrow}{\uparrow})/R{\uparrow}{\uparrow}$$

where,

GMR is the giant magnetoresistance ratio is no longer able to impart sufficiently good texture to provide optimum spin valve performance.

Another problem with a tantalum seed layer is that, at elevated temperatures, it can react with the adjacent free layer of a top spin valve and diminish spin valve performance. This becomes more problematic as free layer thickness is reduced.

SUMMARY

The present invention provides an improved top spin valve and method of fabrication. In the preferred embodiment of the top spin valve of the present invention, a seed layer is formed of material having the elements Ni and Cr. On the seed layer, a free layer is formed, with a spacer layer overlying the free layer and a pinned layer overlying the free layer to form a top spin valve.

In the preferred embodiments, the seed layer is formed of a material that has an ion milling rate comparable to that of the free layer material. This allows the free layer to be formed by ion milling with sidewalls having shorter tails. Shorter tails improves the junction between the free layer and an adjacent magnetic bias layer to improve domain structure within the free layer.

In one embodiment, the seed layer may have NiFeCr, with Cr from about 20% to 50%. In another embodiment, the seed layer may have NiCr, with about 40%. Some embodiments may have the seed layer formed on an optional Ta pre-seed layer.

In preferred embodiments of the present invention, the seed layer of the present invention provides several advantages over convention seed layers. The seed layer of the present invention provides an improved fcc (111) texture for NiFe and for NiFe/CoFe free layers grown on a seed layer of NiFeCr, on a seed layer of NiFeCr/Ta, on a seed layer of NiCr, or on a seed layer of NiCr/Ta.

Furthermore, the seed layer of the present invention also provides improved texture in other overlying layers, such as a D spacer layer, a pinned layer, and a pinning layer. Improving the texture of the pinning layer improves the exchange bias field resulting in better top spin valve thermal stability.

Improving seed layer texture is particularly important as free layer thickness is reduced and seed texture becomes more critical to providing good texture to the free layer and the overlying layers. As such, the seed layer of the preferred embodiments allows optimization of spin valve performance for spin valves with free layers without NiFe, such as a free layer of CoFe.

In preferred embodiments of the present invention, the seed layer provides high resistivity, which minimizes shunting of sensing current. Furthermore, the NiFeCr seed layer and the NiCr seed layer of the preferred embodiments of the present invention are more thermally stable and less reactive with NiFe free layer than Ta. In addition, in preferred embodiments, the seed layer of the present invention improves the magnetostriction of adjacent NiFe free layer material. Moreover, in some embodiments of the present invention, the seed layer may be utilized improve the soft properties of a CoFe free layer without using NiFe or other adjacent magnetic portions or layers.

BRIEF SUMMARY OF THE DRAWINGS

FIG. 4 is tabulated data showing improved exchange bias field for two embodiments in accordance with the present invention.

DETAILED DESCRIPTION OF THE PREFERRED EMBODIMENTS OF THE INVENTION

Figure 1:
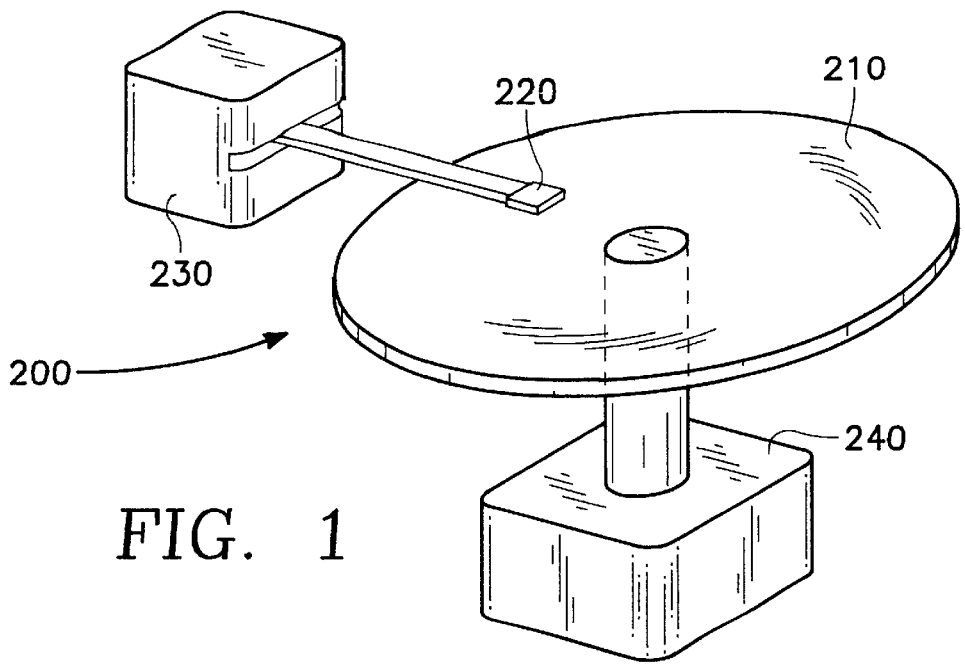
FIG. 1 shows a data storage and retrieval apparatus in accordance with an embodiment of the invention.

FIG. 1 shows the improved spin valve sensor of the present invention embodied in a disk type magnetic data storage and retrieval apparatus 200. The improved spin valve of the present invention is located within a merged head assembly 220 which rides above a magnetic storage media 210, depicted in FIG. 1 as a rotatable hard disk type storage media. The hard disk is coupled to a motor 240 to provide rotation of the disk relative to the head assembly 220. An actuating means 230 may be used to position the head assembly 220 above the surface of the media 210 to read and write data in the form of magnetic bits from and to the media 210. The data storage and retrieval apparatus 200, typically has several hard disks 210 and several corresponding head assemblies 220.

Figure 2:
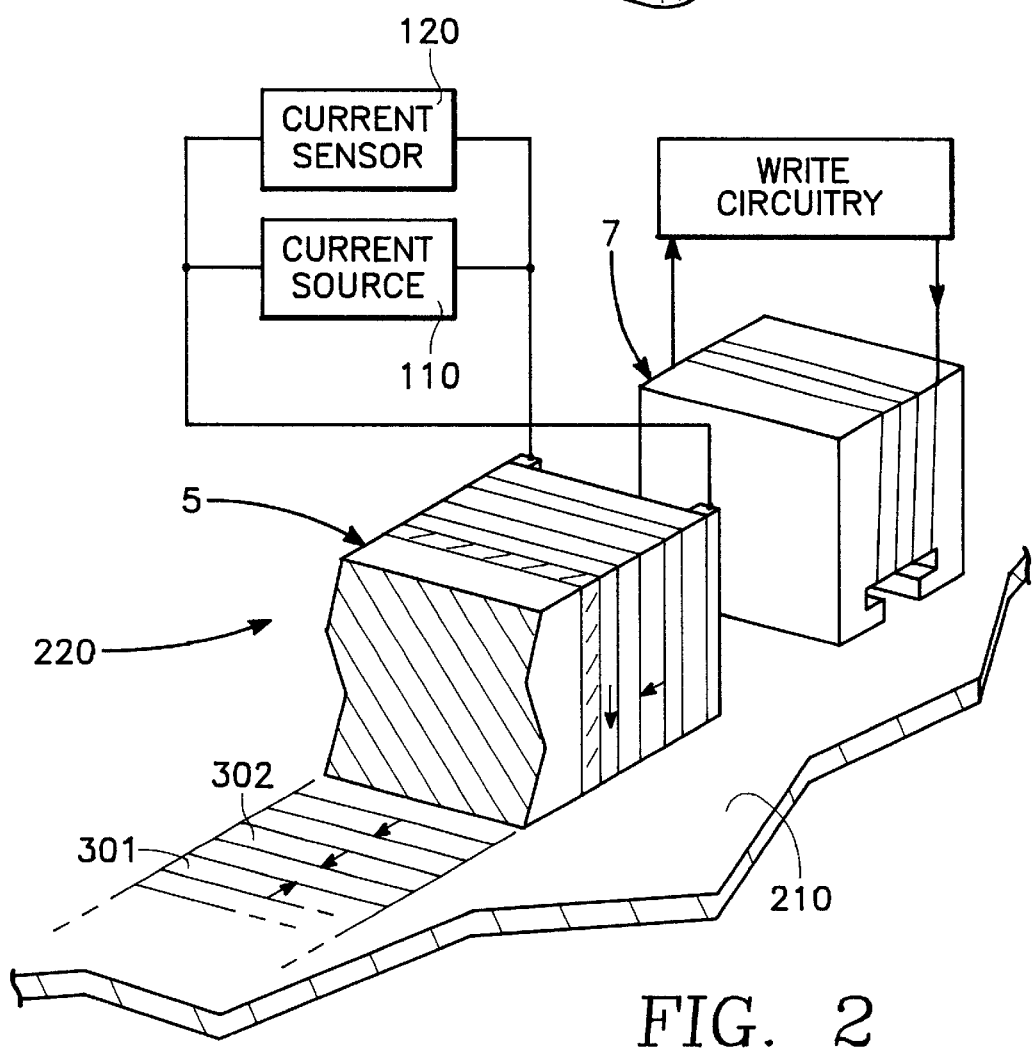
FIG. 2 shows a simplified functional illustration of a head assembly shown in exploded perspective view.

FIG. 2 shows a simplified functional illustration of the head assembly 220. Merged head assemblies 220 are formed having a write head 7, used to write or set the magnetization of bits 301, 302 on the media 210, while a read head 5, reads the magnetization of those bits 301, 302 from the media 210. The depiction in FIG. 2 is a functional representation of a merged head. The merged head of the present invention may be formed by techniques well know in the art, such as by masking, depositing, and etching successive layers to form the well known structures of the merged head 220.

Figure 3:
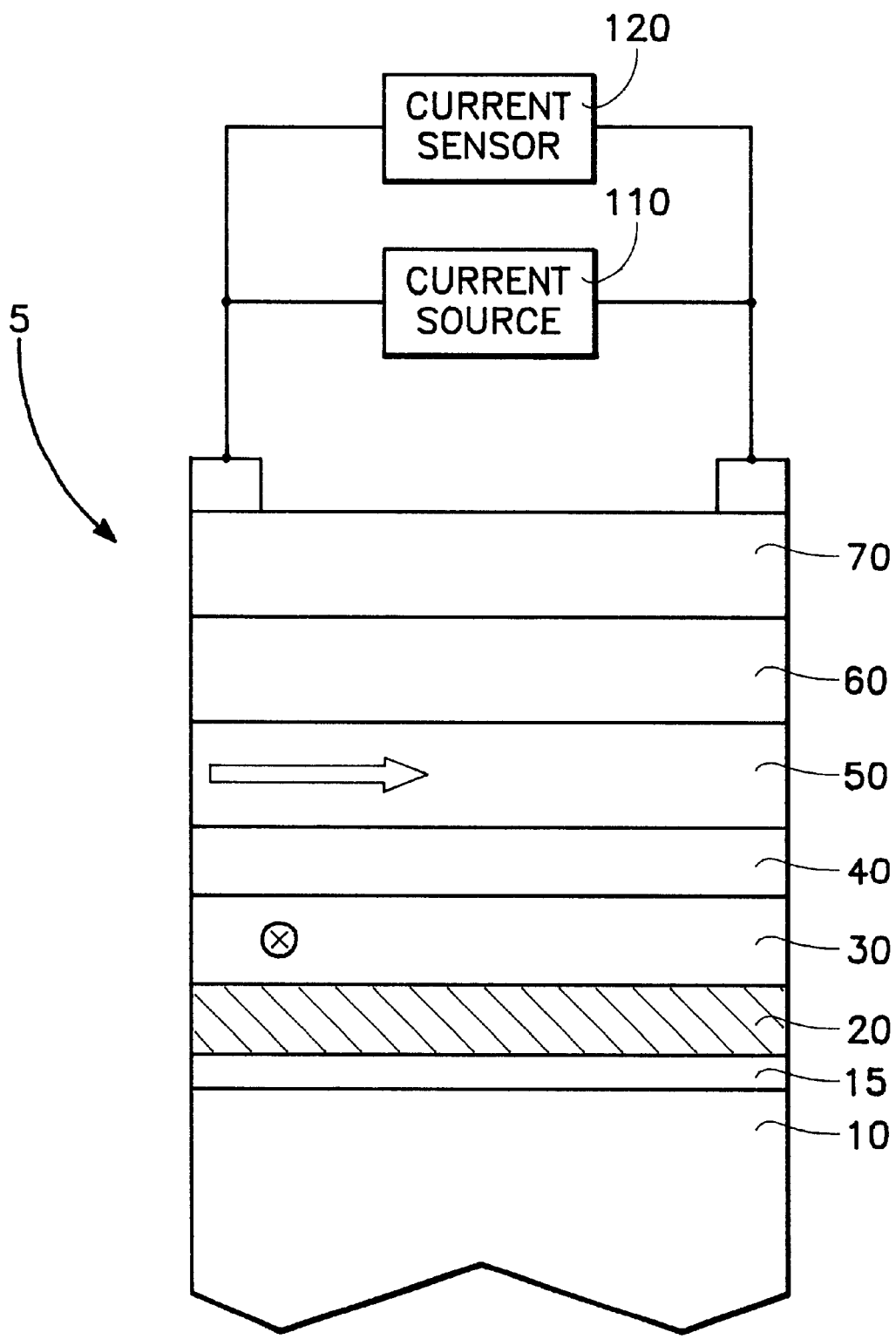
FIG. 3 is a cross-sectional view of the structure of a top spin valve in accordance with a preferred embodiment of the present invention.

FIG. 3 shows the structure of a possible embodiment of a top spin valve of the present invention. The structure of the spin valve of FIG. 3 comprises: a substrate or other insulating layer 10, an improved seed layer 20, a free layer 30, a spacer layer 40, a pinned layer 50, a pinning layer 60, and a capping layer 70. The spin valve 5 of the present invention may be fabricated using techniques well known in the art, such as for example by sputtering and etching.

In the preferred embodiments of the present invention, the improved seed layer 20 is formed of NiFeCr, NiCr, NiFeCr/Ta, or NiCr/Ta having a thickness of preferably in a range of about 30 to about 70 Angstroms. In preferred embodiments of the present invention, the seed layer 20 provides several advantages over convention seed layers. The seed layer 20 of preferred embodiments provides an improved fcc (111) texture for NiFe and for NiFe/CoFe free layers 30 grown on a seed layer 20 of NiFeCr with Cr from about 20% to 50%, on a seed layer of NiFeCr on Ta with Cr from about 20% to 50%, on a seed layer of NiCr with Cr about 40%, or on a seed layer of NiCr on Ta with Cr about 40%. As such, in some embodiments, the improved seed layer 20 may be formed on an optional thin Ta pre-seed layer 15.

In addition to improving the texture of the free layer 30, the seed layer 20 also improves the texture of the overlying layers. Improving seed layer texture is particularly important as free layer thickness is reduced and seed texture becomes more critical to providing good texture to the free layer 20 and the overlying layers. As such, the seed layer of the preferred embodiments of the present invention allows optimization of spin valve performance for spin valves with very thin NiFe free layers, ultra thin NiFe free layers, and with free layer without NiFe, such as a free layer of CoFe.

In addition, in some embodiments, the seed layer 20 also improves pinning layer 60 texture, which results in an improvement in the exchange biasing field $H_{ex}$. An increase exchange bias field Hex improves thermal stability. FIG. 4, shows empirical data of embodiments having a 50 Angstrom Ta seed layer, a 50 Angstrom NiFeCr seed layer having about 24% Cr, and a NiFeCr/Ta seed layer having 20 Angstroms of NiFeCr with about 24% Cr on 20 Angstroms of Ta. The embodiments with the NiFeCr and NiFeCr/Ta seed layers showed improvement in Hex and thermal stability as compared to the Ta seed layer.

In preferred embodiments of the present invention, the seed layer 20 also provides high resistivity, about four to five times that of NiFe, which minimizes shunting of sensing current. Furthermore, in the preferred embodiments, the NiFeCr seed layer and the NiCr seed layer 20 are more thermally stable and less reactive with NiFe free layer 20 than Ta. In addition, in some embodiments, the seed layer 20 improves the magnetostriction of adjacent NiFe free layer material. For example, in the embodiments of FIG. 4, the second and third samples, with NiFeCr50 and Ta20/NiFeCr30 seed layers respectively, show improved magnetostriction of $1 \times 10^{-8}$ as opposed to $1 \times 10^{-6}$ for the first sample having a 50 Angstrom layer of Ta.

Moreover, in some embodiments of the present invention, the seed layer may be utilized improve the soft properties of a CoFe free layer without using NiFe or other adjacent magnetic portions or layers as disclosed in U.S. patent application Ser. No. 09/356,617, by Anderson and Haui, entitled ULTRA THIN FREE LAYER SPIN-VALVE DEVICE WITH ENHANCEMENT LAYER, filed on Jul. 19,1999 and incorporated by reference.

As a further advantage, in preferred embodiments, the NiFeCr free layer allows for more vertical sidewall profile of the free layer and reduces tailing off of the sidewall of the free layer as it nears the seed layer. This allows for an improved free layer-to-bias layer junction to improve spin valve performance.

Figure 5:
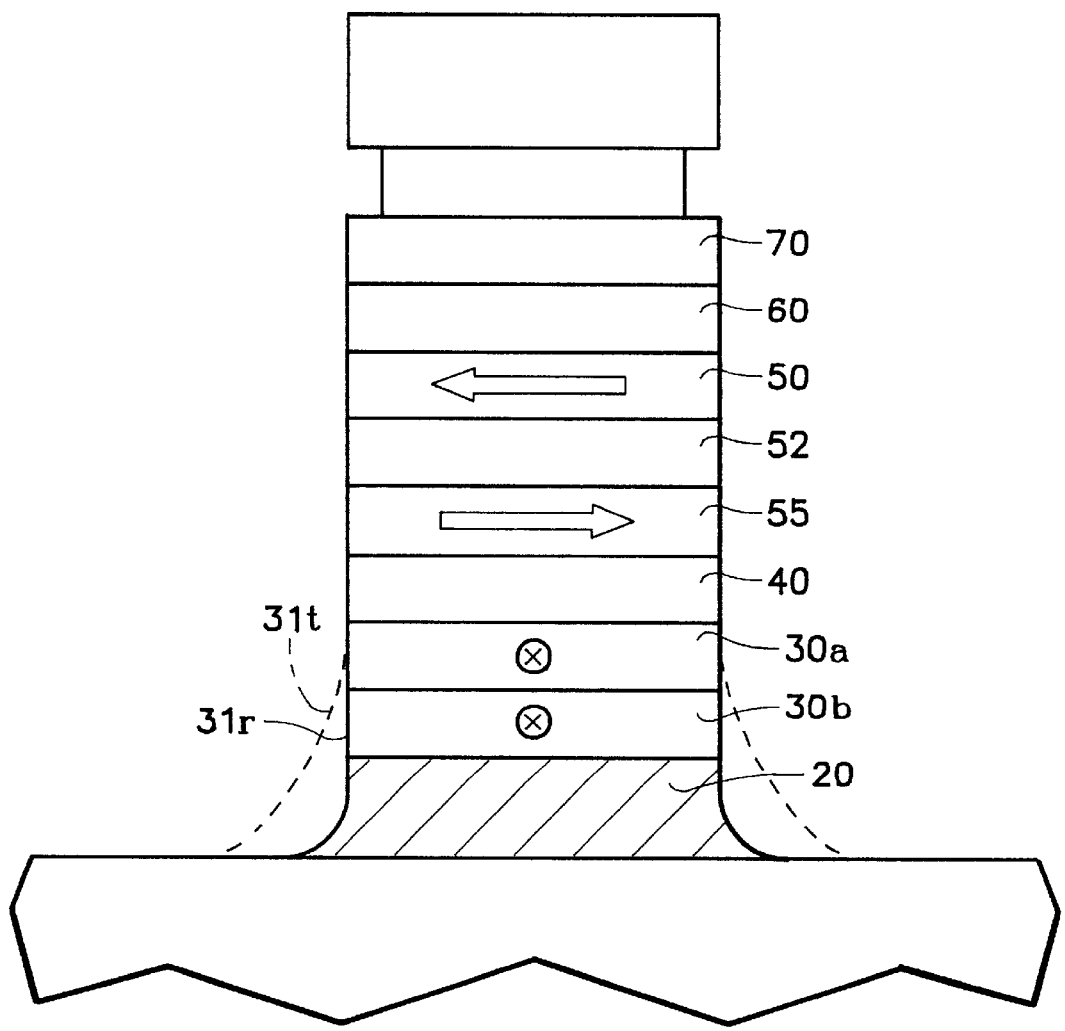
FIG. 5 is a cross-sectional view of the structure of a top spin valve in accordance with a preferred embodiment of the present invention.

Turning to FIG. 5, because the improved seed layer 20 of the present invention has a comparable ion milling rate with NiFe, CoFe, and Cu, which commonly form the free and spacer layers 30 & 40, the free layer 30 may be formed with a reduced tail 31r near the seed layer 20. In particular, a seed layer consisting of NiFeCr has been found to significantly reduce tail length. With a tantalum seed layer, the sidewalls of the free layer 30 would form a longer tail 31t, shown in phantom in FIG. 5, due in part Y to the lower ion mill rate of tantalum. Tantalum has about 40% lower ion mill rate than NiFe, contributing to tail formation near a tantalum seed layer. As such, it is preferred to select the material for the seed layer 20 so that it has a comparable milling rate with the free layer material. Any materials having a milling rate closer to that of the free layer than tantalum are expected to provide improved milling results.

Furthermore, because embodiments of spin valves have additional layers not found in conventional anisotropic magnetoresistive devices additional factors such as shadowing of the milling beam by upper layers, and the possibility of over milling the upper layers contribute to increased tail length in spin valves. For example additional layers such as: an antiferromagnetic pinning layer 60, a pinned layer 50, and several portions 30*a* & 30*b* or more of free layer 30 contribute to increase stack height of spin valves. Furthermore, some embodiments may have additional layers such as an antiparallel coupling layer 52 and an antiparallel pinned layer, which further increases stack height and further contributes to shadowing and upper layer over milling.

The preferred embodiment of the present invention, however, allows for improved spin valve performance by reducing tail size to provide a free layer with more vertical sidewalls. This allows for better junction formation with an adjacent bias magnet to improve the magnetic domain structure of the free layer. It also provides a more well defined trackwidth.

The seed layer material may also be used to form a capping layer 70. As such, in some embodiments of the present invention, NiFeCr, NiCr, or NiCr/Ta may be used as capping layer 70. It is preferred to used the same material for the capping layer 70 as for the seed layer 20 to reduce the amount of different types of materials deposits on processing chamber components.

While the preferred embodiments of the present invention have been described in detail above, many changes to these embodiments may be made without departing from the true scope and teachings of the present invention. The present invention, therefore, is limited only as claimed below.

I claim:

1. A top spin valve comprising:
   a) a seed layer comprising Ni and Cr;
   b) a free layer on the seed layer;
   c) a pinned layer overlying the free layer; and
   d) a spacer layer between the pinned and free layers.

2. The top spin valve of claim 1 wherein the seed layer comprises at least one of NiFeCr comprising about 20% to about 50% Cr or NiCr comprising about 40% Cr.

3. The top spin valve of claim 2 wherein the seed layer comprises a Ta pre-seed layer.

4. The top spin valve of claim 2 wherein the free layer comprises sidewalls having short tails formed by ion milling.

5. The top spin valve of claim 1 wherein the seed layer is non-magnetic.

6. The top spin valve of claim 1 wherein the free layer comprises NiFe, the free layer being formed over the seed layer so as to provide reduced free layer magnetostriction.

7. The top spin valve of claim 1 further comprising a antiferromagnetic pinning layer adjacent the pinned layer, the pinning layer being formed over the seed layer so as to improve pinning layer texture such that the pinning layer provides a stronger exchange coupling field with the adjacent pinned layer so as to improve thermal stability of the top spin valve.

8. The top spin valve of claim 1 wherein the seed layer material has an ion milling rate comparable to that of free layer material so as to allow the free layer to be formed by ion milling with sidewalls having short tails.

9. The top spin valve of claim 8 wherein the seed layer material comprises NiFeCr and the free layer comprises NiFe.

10. The top spin valve of claim 8 wherein the spin valve further comprises an antiparallel coupling layer and a second pinned layer.

11. The top spin valve of claim 1 further comprising a capping layer comprising Ni and Cr.

12. A top spin valve comprising:
    a) a seed layer comprised of at least one of: NiFeCr having about 20% to about 50% Cr, and NiCr having about 40% Cr;
    b) a free layer formed on the seed layer;
    c) a pinned layer overlying the free layer; and
    d) a spacer layer between the pinned and free layers.

13. The top spin valve of claim 12 wherein the seed layer comprises of NiFeCr.

14. The top spin valve of claim 13 wherein the free layer comprises at least one of NiFe and CoFe.

15. The top spin valve of claim 14 wherein the spacer layer comprises Cu.

16. The top spin valve of claim 12 wherein the free layer comprises CoFe.

17. The top spin valve of claim 12 further comprising a capping layer comprised of at least one of: NiFeCr having in a range of about 20% to 50% Cr, and NiCr having about 40% Cr.

18. A method for fabricating a top spin valve comprising:
    a) forming a seed layer of non-magnetic material comprising at least one of NiFeCr, and NiCr;
    b) forming a free layer on the seed layer;
    c) forming a spacer layer over the free layer; and
    d) forming a pinned layer over the spacer layer.

19. The method of claim 18 further comprising etching the pinned, spacer and free layers to define a stack, and wherein formation of the seed layer allows the free layer to be etched with reduced tail length.

20. The method of claim 19 wherein the seed layer is formed of a material that has a compatible etch rate with material that forms the free layer.

21. The method of claim 20 wherein the free layer comprises at least one of NiFe and CoFe, and wherein the spacer layer comprises Cu.

* * * * *